United States Patent
Bouillet et al.

(10) Patent No.: US 11,911,998 B2
(45) Date of Patent: Feb. 27, 2024

(54) HYBRID ACOUSTIC INTERLAYER CONSISTING OF AN ADHESIVE CORE LAYER MADE OF POLYMER-MATRIX NANOCOMPOSITES

(71) Applicant: SAINT-GOBAIN GLASS FRANCE, Courbevoie (FR)

(72) Inventors: Fabien Bouillet, Compiegne (FR); Ollin Alan Luna Cornejo, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 266 days.

(21) Appl. No.: 17/421,231

(22) PCT Filed: Jan. 14, 2020

(86) PCT No.: PCT/FR2020/050046
§ 371 (c)(1),
(2) Date: Jul. 7, 2021

(87) PCT Pub. No.: WO2020/148502
PCT Pub. Date: Jul. 23, 2020

(65) Prior Publication Data
US 2022/0055353 A1    Feb. 24, 2022

(30) Foreign Application Priority Data
Jan. 17, 2019 (FR) ...................................... 1900405

(51) Int. Cl.
*B32B 17/10* (2006.01)

(52) U.S. Cl.
CPC .. *B32B 17/10743* (2013.01); *B32B 17/10761* (2013.01); *B32B 17/10788* (2013.01); *B32B 2250/03* (2013.01); *B32B 2255/10* (2013.01); *B32B 2255/26* (2013.01); *B32B 2307/102* (2013.01); *B32B 2307/412* (2013.01); *B32B 2307/732* (2013.01)

(58) Field of Classification Search
None
See application file for complete search history.

(56) References Cited

U.S. PATENT DOCUMENTS

| | | |
|---|---|---|
| 3,833,404 A | 9/1974 | Sperling et al. |
| 5,190,826 A | 3/1993 | Asahina et al. |
| 5,340,654 A | 8/1994 | Ueda et al. |
| 2006/0021782 A1 | 2/2006 | Tsubaki |
| 2007/0128452 A1* | 6/2007 | Fisher ................. G02F 1/16757 428/437 |
| 2012/0034439 A1* | 2/2012 | Milamon .......... B32B 17/10036 428/221 |
| 2016/0111077 A1 | 4/2016 | Lu |
| 2016/0160031 A1* | 6/2016 | Karagiannis ............ B32B 27/06 428/501 |
| 2016/0171961 A1 | 6/2016 | Lu |
| 2019/0160782 A1* | 5/2019 | Harding ................. B32B 27/32 |
| 2019/0210328 A1* | 7/2019 | Gillessen .......... B32B 17/10036 |
| 2019/0382559 A1* | 12/2019 | Condo .................... C08L 63/00 |

FOREIGN PATENT DOCUMENTS

| | | |
|---|---|---|
| CN | 1624015 A | 6/2005 |
| CN | 107864642 A | 3/2018 |
| EP | 0 566 890 A1 | 10/1993 |
| FR | 3 013 631 A1 | 5/2015 |
| JP | 2002105419 A * | 4/2002 |

OTHER PUBLICATIONS

International Search Report as issued in International Patent Application No. PCT/FR2020/050046, dated Mar. 24, 2020.
First Office Action as issued in Chinese Patent Application No. 202080000768.2, dated Jun. 1, 2022.

* cited by examiner

*Primary Examiner* — Tamra L. Dicus
(74) *Attorney, Agent, or Firm* — Pillsbury Winthrop Shaw Pittman LLP

(57) ABSTRACT

An interlayer for laminated glasses, includes two outer layers of a material selected from poly(vinyl butydownral) (PVB) and poly(ethylene-vinyl acetate) (EVA), assembled by an adhesive nanocomposite layer including a first, discontinuous phase consisting of polymeric nanodomains having a glass transition temperature (Tg) of between −50° C. and −30° C., and a second, continuous polymeric phase, referred to as the matrix, having a glass transition temperature (Tg) lower than that of the first phase, the first phase being dispersed in the second phase.

18 Claims, No Drawings

HYBRID ACOUSTIC INTERLAYER CONSISTING OF AN ADHESIVE CORE LAYER MADE OF POLYMER-MATRIX NANOCOMPOSITES

CROSS-REFERENCE TO RELATED APPLICATIONS

This application is the U.S. National Stage of PCT/FR2020/050046, filed Jan. 14, 2020, which in turn claims priority to French patent application number 1900405 filed Jan. 17, 2019. The content of these applications are incorporated herein by reference in their entireties.

The present invention relates to an interlayer for laminated glasses, having vibration damping properties, and also to a method for its manufacture. The invention likewise relates to a laminated glazing unit comprising an interlayer of this kind, and to the use of said glazing unit as a vehicle windshield and/or as construction glazing, for damping vibrations and structure-borne noises between 1 Hz and 1000 Hz and/or for enhancing the loss of transmission to air-borne noises in particular over the audible frequency decade of between 1 kHz and 10 kHz.

Laminated glazing units are in common use in the field of transport, and more particularly in the windows of automobiles and aircraft, and also in construction. The function of the laminated glazing units is to suppress the risk of fragment projection in the event of sudden breakage, and to delay forced entry. Further advantages of laminated glazing units are to reduce the transmission of UV and/or infrared radiation and to reduce the transmission of noise from the outside to the inside of the vehicles or the building, thereby enhancing the vibrational and acoustic comfort of the passengers or occupants.

Laminated glazing units are generally composed of a first glass sheet and a second glass sheet, with an interlayer between them. These glazing units are manufactured by a known method—for example, by assembly with heat and under pressure.

In the case of a laminated glazing unit with vibration damping properties, a three-ply interlayer has been described, comprising two layers of Poly(Vinyl Butyral) (PVB), also called "outer layers" or "skins", assembled by means of a layer of PVB, also called "inner layer" or "core". The physicochemisty of the PVB in the inner layer is different from that of the PVB in the two outer layers (see, for example, U.S. Pat. Nos. 5,340,654 and 5,190,826, US 2006/021782 and US 2016/0171961). Specifically, the PVB in the core has a lower residual hydroxyl (—OH group) content than the PVB in the skins. The residual hydroxyl content refers to the amount of hydroxyl groups which remain as side groups on the vinyl chain of the PVB following the acetylation of poly(vinyl alcohol) with butyraldehyde. The higher hydroxyl group content of the outer PVB layers translates to reduced compatibility with the plasticizer, so leading, during the autoclaving step, to migration of the plasticizer toward the PVB in the inner layer. The plasticizer increases the viscous component and so improves the vibration damping properties of the viscoelastic inner layer, while the outer layers are stiff, so ensuring the handling and the mechanical strength of the interlayer. The contribution of the stiff outer layers to the vibration damping properties is generally very small.

With the aim of enhancing the acoustic insulation performance of laminated glazing units comprising a three-ply interlayer as described above, consideration has been given to reducing still further the residual hydroxyl group content of the PVB in the inner layer so as to increase its plasticizer content. This, however, has resulted in a shift in the value of the glass transition temperature (Tg) of the PVB in the core toward excessively low temperatures, and consequently in the effective damping of vibrations in the frequency range of interest, of between 1 Hz and 10 kHz, at a temperature lower than the ambient temperature. Vibration damping in the frequency range of interest was therefore reduced at the operating temperatures of the glazing unit.

Consideration has also been given to increasing the residual hydroxyl group content of the PVB in the inner layer and also reducing its plasticizer content. This, however, resulted in a decrease in the viscous component of the PVB in the core, and in a shift in the value of the glass transition temperature (Tg) of said PVB toward excessively high temperatures, likewise reducing the vibration damping power in the frequency range of interest at ambient temperature.

These two approaches, which involve tailoring the hydroxyl group content of the inner PVB layer in the interlayers, have therefore ended in an impasse linked to the undesirable but inevitable increase/decrease of the glass transition temperature (Tg).

The idea behind the present invention is to replace in a three-ply interlayer, as defined above, the inner PVB layer by a layer formed of a particular polymeric structure, different from PVB, which has a very high damping factor (tan δ) in the frequency decade between 1 kHz and 10 kHz, preferably in the frequency interval between 1 Hz and 10 kHz, at temperatures close to the ambient temperature.

The polymeric system selected by the Applicant is a system with two polymeric phases: a first, discontinuous, phase, consisting of polymeric nanodomains having a particular Tg, of between −50° C. and −30° C., preferably between −45° C. and −35° C., and a second, continuous, polymeric phase, having a Tg lower than that of said first phase. The first phase is dispersed in the second phase, with the latter forming a kind of matrix surrounding the nanodomains.

The Tg of said first phase is selected such that vibration damping is at its maximum in the frequency decade between 1 kHz and 10 kHz, preferably in the frequency range between 1 Hz and 10 kHz, at a temperature of between 0° C. and 40° C., preferably between 10° C. and 30° C., more preferably between 15° C. and 25° C., and more preferably still for a temperature of or close to 20° C.

Furthermore, the Applicant has found that the use of a polymeric system based on an interpenetrating polymer network (IPN) resulted in a loss factor (tan delta), determined by dynamic mechanical analysis, which had a high value in a vibrational frequency range much broader than each of the polymers forming said IPN.

The Applicant therefore proposes the use of a polymeric system of interpenetrating polymer network (IPN) type for forming the core of a three-ply interlayer for laminated glasses.

The Applicant proposes in particular the use of a latex, this being an aqueous emulsion of polymeric particles, containing an IPN phase for forming the inner layer of a three-ply interlayer intended for the manufacture of laminated glazing units. The two outer layers of the interlayer may be made of poly(vinyl butyral) (PVB) or else of poly(ethylene-vinyl acetate) (EVA) which may replace the PVB in certain applications.

The IPN latex is used in the present invention for bonding the two outer layers of the interlayer to one another. After coalescence of the polymeric particles, the IPN latex thus forms an adhesive layer in which the IPN phases remain visible by electron microscopy. They are surrounded by a continuous polymeric phase, sometimes referred to hereinafter as the matrix, which fulfils the adhesive function of the inner layer. The term "nanocomposite", which is used below to describe the present invention, denotes this polymeric structure consisting of a polymeric matrix, having a highly adhesive character, dispersed in which there are polymeric nanoparticles or nanodomains, which are still visible in the interlayer after coalescence of the latex.

A first subject of the present patent application, therefore, is an interlayer for laminated glasses, comprising two outer layers of a material selected from poly(vinyl butyral) (PVB) and poly(ethylene-vinyl acetate) (EVA), assembled by means of an adhesive nanocomposite layer comprising:

a first, discontinuous phase consisting of polymeric nanodomains having a glass transition temperature (Tg) of between −50° C. and −30° C., preferably between −45° C. and −35° C., and a second, continuous polymeric phase, referred to as the matrix, having a glass transition temperature (Tg) lower than that of said first phase, preferably a Tg of less than −50° C., and more preferably less than −60° C., the first phase being dispersed in the second phase.

The two outer layers of the interlayer are preferably layers of poly(vinyl butyral) (PVB).

The first phase of the polymeric system selected by the Applicant consists of polymeric nanodomains formed preferably by an interpenetrating polymer network (IPN). This first, discontinuous phase, as explained at the outset, will fulfil the role of vibration dampener in the frequency decade of between 1 kHz and 10 kHz, preferably in the frequency range between 1 Hz and 10 kHz, at ambient temperature, while the second polymeric phase, surrounding said nanodomains, forms a continuous matrix around the first phase, its function being essentially that of joining the nanoparticles of the first phase to one another and bonding to one another the two outer layers of the lamination interlayer.

Thus, the polymeric system selected by the Applicant to give the inner layer of the three-ply interlayer, according to the invention, is formed preferably from latex. In the present description, the term "latex" refers to a dispersion of polymeric particles in water or in an aqueous solvent. According to the invention, the latex comprises polymeric particles having a core-shell structure, in which:

the core is formed of an interpenetrating polymer network (IPN) having a glass transition temperature (Tg) of between −50° C. and −30° C., preferably between −45° C. and −35° C., and the shell is formed of a polymer having a Tg sufficiently low to allow the particles to coalesce after drying; this Tg is less than that of said core, and is preferably less than −50° C., and more preferably less than −60° C.

The core formed of an interpenetrating polymer network (IPN) according to the invention is obtained by two sequential polymerizations. The IPN therefore comprises a first polymer (P1), which is crosslinked, and a second polymer (P2), which may be crosslinked or non-crosslinked.

In one preferred embodiment of the invention, the second polymer (P2) is non-crosslinked. In this case, the IPN is a "semi-interpenetrating polymer network" or semi-IPN. The second polymer may be linear or branched.

The synthesis of IPNs in latex form has been known for many years and is familiar to the skilled person. It is described for example in U.S. Pat. No. 3,833,404.

According to the invention, the IPN may be synthesized as follows:

formation of an aqueous dispersion of a first crosslinked polymer (P1) by polymerization in emulsion, said first polymer preferably having a Tg of greater than −30° C., more particularly greater than −20° C., incorporation of monomers, with or without crosslinking agent, into the first crosslinked polymer, the monomers incorporated into the first polymer causing it to swell, and then polymerizing to form the second polymer of the interpenetrating polymer network, having a Tg of less than −40° C., preferably less than −50° C.

When the second polymerization step is conducted in the presence of crosslinking comonomers, it leads to a second crosslinked polymer (P2) and to the formation of an IPN.

When the second polymerization step is conducted in the absence of crosslinking comonomer, the second polymer (P2) will not be crosslinked and a semi-IPN will be formed.

The local entanglement of the chains of the first polymer (P1) with the chains of the second polymer (P2), whose Tg is lower than that of the first polymer, allows to confer to the (semi-)IPN, thus formed, a Tg which is intermediate between that of the first polymer and that of the second polymer.

The difference between the Tg of the first polymer (P1) and the Tg of the second polymer (P2) is preferably between 10° C. and 60° C., preferably between 20° C. and 50° C.

According to the invention, the glass transition temperature (Tg) is measured by Differential Scanning calorimetry (DSC). The glass transition temperature is determined using the midpoint method as described in standard ASTM-D-3418 for differential scanning calorimetry. The measuring instrument used by the Applicant is the Discovery DSC model from TA Instruments.

The first and second polymers forming the interpenetrating polymer network may in principle be synthesized using any mixture of comonomers that is capable of copolymerizing by radical polymerization. The Fox equation (T. G. Fox, Bull. Am. Phys. Soc. 1, 123 (1956)) allows the skilled person to select the comonomers and their proportions in the reaction mixture to arrive at a copolymer having the desired glass transition temperature.

Examples of monomers which are copolymerizable in emulsion include those selected from the group consisting of methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, pentyl acrylate, pentyl methacrylate, isoamyl acrylate, isoamyl methacrylate, hexyl acrylate, hexyl methacrylate, cyclohexyl acrylate, cyclohexyl methacrylate, octyl acrylate, octyl methacrylate, isooctyl acrylate, isooctyl methacrylate, nonyl acrylate, nonyl methacrylate, isononyl acrylate, isononyl methacrylate, decyl acrylate, decyl methacrylate, dodecyl acrylate, dodecyl methacrylate, tridecyl acrylate, tridecyl methacrylate, hexadecyl acrylate, hexadecyl methacrylate, octadecyl acrylate, octadecyl methacrylate, 2-ethylhexyl acrylate, 2-ethylhexyl methacrylate, vinyl formate, vinyl acrylate, vinyl propionate, 2-hydroxyethyl acrylate, hydroxyethyl methacrylate, 2-hydroxypropyl acrylate, 2-hydroxypropyl methacrylate, styrene, and acrylonitrile.

The crosslinking comonomers are, for example, diallyl phthalate, triallyl cyanurate, ethylene glycol diacrylate, ethylene glycol dimethacrylate, 1,4-butanediol, diacrylate, 1,4-butanediol dimethacrylate, 1,6-hexanediol diacrylate, 1,6-hexanediol dimethacrylate, diethylene glycol diacrylate, diethylene glycol dimethacrylate, allyl acrylate, and allyl methacrylate.

The water-insoluble monomers are advantageously admixed with a small fraction, generally less than 5% by weight, of water-soluble comonomers, which will copolymerize with the water-insoluble monomers or will polymerize separately and form polymers which adsorb on the surface of the latex particles.

These water-soluble monomers are preferably acids, generally carboxylic acids, and are selected preferably from the group consisting of methacrylic acid, acrylic acid, itaconic acid, and fumaric acid. The presence of anionic charges on the surface enhances the colloidal stability of the latexes.

The emulsion polymerization is conducted conventionally in the presence of an emulsifier, preferably in the presence of a non-ionic surfactant, such as for example a polyoxyethylene glycol ester.

Conventionally, the initiators which can used in the radical polymerization in emulsion must be soluble in the aqueous phase of the reaction mixture. Examples of water-soluble peroxides which may be mentioned include inorganic peroxides, such as hydrogen peroxide or ammonium or potassium persulfate. The initiator may also be admixed with a reducing agent such as ferrous sulfate ($FeSO_3$), which promotes the formation of radicals.

More particularly, the inner layer of the three-ply interlayer according to the invention is obtained by applying a latex comprising polymeric particles having a core-shell structure as described above to one of the faces of a first sheet of PVB or EVA, then drying said latex. During the drying of said latex, the water or the aqueous phase disappears:
- the cores of the polymeric particles of the latex become polymeric nanodomains forming the first discontinuous phase and having a Tg of between −50° C. and −30° C.; these nanodomains therefore have the same characteristics as the cores of the above-described particles of the latex, and
- thanks to the low-Tg shells, the polymeric particles of the latex coalesce and then form a second continuous polymeric phase, referred to as the matrix, which surrounds said nanodomains of the first phase.

The inventors have found, surprisingly, that the coalescence of the polymeric latex particles having the characteristics as defined above and leading to the formation of the said two polymeric phases confers to the adhesive nanocomposite layer in the core, thus formed, good vibration damping properties, contributing in particular to enhanced acoustic insulation on the part of the laminated glazing unit having this interlayer, relative to a laminated glazing unit having a three-ply interlayer in which the inner layer is a PVB layer having a low residual level of hydroxyl groups.

This enhancement of acoustic insulation is due to a tan δ loss factor (determined by dynamic mechanical analysis) of the inner layer of a three-ply interlayer, according to the invention, that has a value greater than or equal to 1.6, preferably greater than or equal to 2, more particularly greater than equal to 3, or even greater than or equal to 4, in the frequency decade between 1 kHz and 10 kHz, preferably in the frequency range between 1 Hz and 10 kHz, for a temperature range between 0° C. and 40° C., preferably between 10° C. and 30° C., more preferably between 15° C. and 25° C., and more preferably still for a temperature of or close to 20° C.

It is therefore been found, surprisingly, by the inventors that the core-shell structure of the polymeric particles of the latex, as described above, when said particles coalesce after drying of said latex in a three-ply interlayer according to the invention, produce loss factors of between 4 and 5 for the inner layer of said interlayer, this being 4 times to 6 times more than for a conventional PVB inner layer.

The tan δ loss factor of a material corresponds to the ratio between the energy dissipated in the form of heat and the energy of elastic deformation. It therefore corresponds to a technical characteristic inherent at the nature of a material, and reflects its capacity to dissipate energy, more particular acoustic waves. The greater the loss factor, the greater the dissipation of energy, and the greater the extent to which the material functions in vibration damping. This tan δ loss factor varies depending on the temperature and on the frequency of the incident wave. For a given frequency, the loss factor reaches its maximum value at a temperature, which is called the glass transition temperature, determined by dynamic mechanical analysis. This tan δ loss factor may be estimated using a rheometer or any other appropriate known device. The rheometer is an instrument which subjects a sample of material to deformation stresses under precise temperature and frequency conditions, so as to obtain and process all of the rheological parameters which characterize the material. The loss factor is measured more specifically using a rotational rheometer in oscillation mode, where the sample is subjected to a sinusoidal stress for angular velocities ω of 1 to 1000 rad/s in a temperature range from −100° C. to 100° C. with plateaus at every 5° C. The rheometer used by the Applicant is the MCR 302 model from Anton Paar. It should be noted that the tan δ loss factor of the inner layer defines the tan δ loss factor of the interlayer, which has substantially the same value, as long as the volume fraction of the inner layer is not too small.

Thus, the use of an interlayer having an inner layer with a relatively higher tan δ loss factor enables a further improvement in the acoustic insulation performance of the glazing unit comprising it.

In one preferred embodiment according to the invention, the IPN nanodomains of the first phase in the core of the three-ply interlayer have a number-average equivalent diameter of between 10 and 1000 nm, preferably between 20 and 400 nm, and ideally between 30 and 250 nm. Said diameter is measured using a dynamic light scattering (DLS) instrument, this being a non-destructive spectroscopic analysis technique which provides access to the size of particles in suspension in a liquid or of polymer chains in solution of approximately 1 to 5000 nm in diameter. The measuring instrument used by the Applicant is the Zetasizer Nano Series model from Malvern Instruments. The small size of nanodomains limits the diffusion of the light by the nanodomains and increases the transparency of the inner layer of the three-ply interlayer, according to the invention.

The difference between the refractive index of the first phase ($n_1$) and the refraction index of the second phase ($n_2$) is preferably less than 0.2, preferably less than 0.1, and ideally less than 0.05. The refractive indices $n_1$ and $n_2$ are advantageously between 1.40 and 1.60, preferably between 1.45 and 1.55. The respective value of these refractive indices enables a reduction in reflections of light at the interfaces between the core and the shell, and hence a reduction in the diffusion of light by the core layer, ultimately improving the transparency of the laminated glass.

In one particular aspect of the invention, the ratio of the volume of the first phase to the volume of the second phase in the inner layer of the three-ply interlayer is between 20/80 and 80/20, preferably between 30/70 and 70/30.

The polymer forming the matrix surrounding said nanodomains is preferably identical to the second polymer (P2) forming the interpenetrating polymer network of the first phase. This polymer may be an acrylic copolymer comprising at least one acrylic monomer.

In one embodiment, the adhesive nanocomposite layer of the three-ply interlayer according to the invention further comprises a tackifying agent and/or a plasticizing agent. The addition of tackifying agent and/or plasticizing agent enhances the vibration damping in the frequency decade between 1 kHz and 10 kHz, preferably in the frequency range between 1 Hz and 10 kHz, for a temperature of between 0° C. and 40° C., and increases the value of the loss factor beyond 4, and assists the coalescence of the particle shells during the drying of the latex, and lastly enhances the adhesion properties of the core layer to the PVB layers. The tackifier may be selected from natural tackifying resins, in particular rosins and terpenes, and synthetic tackifying resins such as aliphatic, aromatic, and hydrogenated resins derived from petroleum.

The tackifier used is preferably a terpene modified to be transparent and colorless and having a Gardner index of strictly less than 1 on the Gardner color scale, such as the Crystazene 110 product from DRT. The amount of tackifier may be between 1% and 8% by weight, relative to the total weight of latex, preferably between 2% and 5% by weight.

In one preferred embodiment, the adhesive nanocomposite layer is directly in contact with the two outer PVB layers in an interlayer according to the present invention.

In one particular aspect of the invention, the thickness of the adhesive nanocomposite inner layer of the invention is preferably between 5 and 50 micrometers, more preferably between 10 and 30 micrometers. The use of a core with a thickness on the micrometer scale allows to reduce the risks of running of the latex forming the core during its application. This thickness also makes it possible to adjust the stiffness of the three-ply interlayer so as to obtain a stiffness on the scale of the laminated glazing, respecting the stresses in forming and in curvature of the eventual laminated glazing unit, and to ensure the safety of passengers or occupants in the event of breakage of the laminated glass.

The thickness of the outer PVB layers in a three-ply interlayer of the invention may be between 200 and 500 micrometers, preferably between 300 and 400 micrometers, and ideally around 380 micrometers.

In one particular aspect of the invention, the inner layer represents a volume fraction of the interlayer of between 0.2% and 8%, preferably between 0.5% and 8%, preferably between 2.5% and 4%. Selecting such a value for the volume fraction of the inner layer within the interlayer offers a satisfactory trade-off between the requirement for stiffness, on the one hand, and the acoustic insulation performance, on the other.

The invention also relates to a method for manufacturing a viscoelastic interlayer for laminated glasses, comprising the following steps:
 supplying a first sheet of a material selected from poly (vinyl butyral) (PVB) and poly(ethylene-vinyl acetate) (EVA),
 applying to one of the faces of said first sheet a latex comprising polymeric particles having a core-shell structure in which
  the core is formed of an interpenetrating polymer network (IPN) having a Tg of between −50° C. and −30° C., preferably between −45° C. and −35° C., and
  the shell is formed of a polymer having a Tg of less than that of said core, preferably a Tg of less than −50° C., and more preferably less than −60° C.;
 drying the latex to form an adhesive nanocomposite layer;
 applying to the resultant adhesive nanocomposite layer a second sheet of a material selected from poly(vinyl butyral) (PVB) and poly(ethylene-vinyl acetate) (EVA).

The application of a latex to one of the faces of said first PVB sheet takes place preferably by the known process of roll-to-roll liquid coating, more specifically by the process with a reverse-roll coater which is fed with the latex via a nip (nip-fed reverse roll).

The drying step is carried out preferably continuously, at ambient temperature and/or in an oven at a temperature of between 40° C. and 120° C., preferably between 60° C. and 100° C. This drying step is advantageously carried out under a reduced pressure of between 0.01 atm and 1 atm, preferably between 0.1 atm and 0.5 atm, ideally at a pressure of 0.25 atm. A second PVB sheet is then applied above the film obtained from the drying of latex.

The parameters of the method, such as the tension of the PVB sheets in the method and the stability of the rolls and of the feeling of the latex via the nip, may be controlled in such a way that the three-ply interlayer of the invention does not exhibit any waviness defects.

The invention likewise relates to a laminated glazing unit comprising:
 a first glass sheet,
 a second glass sheet,
 an interlayer as described above, the interlayer being arranged between the first and second glass sheets.

In one particular aspect of the invention, said first glass sheet has a thickness of between 0.5 and 3 mm, preferably between 1.4 and 2.1 mm, and said second glass sheet has a thickness of between 0.5 and 2.1 mm, preferably between 1.1 and 1.6 mm.

The technical advantages imparted by an interlayer of the invention, as have been described in the present text, likewise relate to a laminated glazing unit containing an interlayer of this kind. The Applicant therefore proposes a laminated glazing unit comprising a particular interlayer as described above, possessing good vibration damping properties in the frequency decade between 1 kHz and 10 kHz, preferably in the frequency range between 1 Hz and 10 kHz, for a temperature range of between 0° C. and 40° C., preferably between 10° C. and 30° C., more preferably between 15° C. and 25° C., and more preferably still for a temperature of or close to 20° C., at which said laminated glazing unit is used.

Moreover, the interlayer of the invention may:
 be colored in the mass over part of its surface, enabling privacy for persons within a vehicle or else protecting the driver of a vehicle from sunlight dazzle, or simply for an esthetic effect, and/or
 have a cross section which reduces in a wedge shape from the top to the bottom of the laminated glazing unit, in order to allow the laminated glazing unit to be used as a screen for a Head Up Display (HUD) system, and/or
 comprise particles having a filtering function for infrared radiation, in order to limit the rise in temperature within a vehicle caused by the infrared radiation of the sun, to enhance the comfort of the passengers in the vehicle or of occupants in the building.

The invention also relates to the use of a laminated glazing unit as described above as a vehicle windshield and/or as construction glazing for damping the vibrations and the structure-borne noises between 1 Hz and 1000 Hz and/or for increasing the loss of transmission to airborne noises in the audible frequency decade between 1 kHz and 10 kHz. Where the glazing unit of the invention is used as a windshield, it meets, of course, all of the conditions of United Nations Regulation No. 43 (or simply regulation R43) for heavy impact resistance, in order to ensure its mechanical strength.

The invention claimed is:

1. An interlayer for laminated glasses, comprising two outer layers of a material selected from poly(vinyl butyral) (PVB) and poly(ethylene-vinyl acetate) (EVA), assembled by an adhesive nanocomposite layer comprising:
   a first, discontinuous phase consisting of polymeric nanodomains having a glass transition temperature (Tg) of between −50° C. and −30° C., and
   a second, continuous polymeric phase having a glass transition temperature (Tg) lower than that of said first phase,
   the first phase being dispersed in the second phase.

2. The interlayer for laminated glasses as claimed in claim 1, wherein the two outer layers are layers of poly(vinyl butyral) (PVB).

3. The interlayer for laminated glasses as claimed in claim 1, wherein the polymeric nanodomains of the first phase are formed of an interpenetrating polymer network comprising a first polymer, which is crosslinked, and a second polymer which is crosslinked or non-crosslinked.

4. The interlayer for laminated glasses as claimed in claim 1, wherein the polymeric nanodomains forming the first phase have a number-average equivalent diameter of between 10 and 1000 nm.

5. The interlayer for laminated glasses as claimed in claim 1, wherein said adhesive nanocomposite layer has a thickness of between 5 and 50 micrometers.

6. The interlayer for laminated glasses as claimed in claim 3, wherein the second polymer is non-crosslinked.

7. The interlayer for laminated glasses as claimed in claim 3, wherein the first polymer has a Tg of greater than −30° C.

8. The interlayer for laminated glasses as claimed in claim 3, wherein the second polymer has a Tg of less than −50° C.

9. The interlayer for laminated glasses as claimed in claim 7, wherein the difference between the Tg of the first polymer and the Tg of the second polymer is between 10° C. and 60° C.

10. The interlayer for laminated glasses as claimed in claim 3, wherein the first and second polymers are acrylic copolymers, comprising at least one acrylic monomer.

11. The interlayer for laminated glasses as claimed in claim 1, wherein a difference between a refractive index of the first phase and a refractive index of the second phase is less than 0.2.

12. The interlayer for laminated glasses as claimed in claim 1, wherein the adhesive nanocomposite layer is directly in contact with the two outer layers.

13. The interlayer for laminated glasses as claimed in claim 1, wherein a ratio of a volume of the first phase to a volume of the second phase is between 20/80 and 80/20.

14. A laminated glazing unit comprising:
   a first glass sheet,
   a second glass sheet,
   an interlayer as claimed in claim 1, the interlayer being arranged between the first and second glass sheets.

15. The interlayer for laminated glasses as claimed in claim 1, wherein the first, discontinuous phase consisting of polymeric nanodomains has a glass transition temperature (Tg) of between −45° C. and −35° C., and wherein the second, continuous polymeric phase has a glass transition temperature (Tg) of less than −50° C.

16. The interlayer for laminated glasses as claimed in claim 4, wherein the number-average equivalent diameter is between 20 and 400 nm.

17. The interlayer for laminated glasses as claimed in claim 5, wherein the thickness is between 10 and 30 micrometers.

18. The interlayer for laminated glasses as claimed in claim 7, wherein the first polymer has a Tg of greater than −20° C.

* * * * *